(No Model.)
C. H. C. SCHMANDT.
BONE BLACK KILN.
No. 345,324. Patented July 13, 1886.
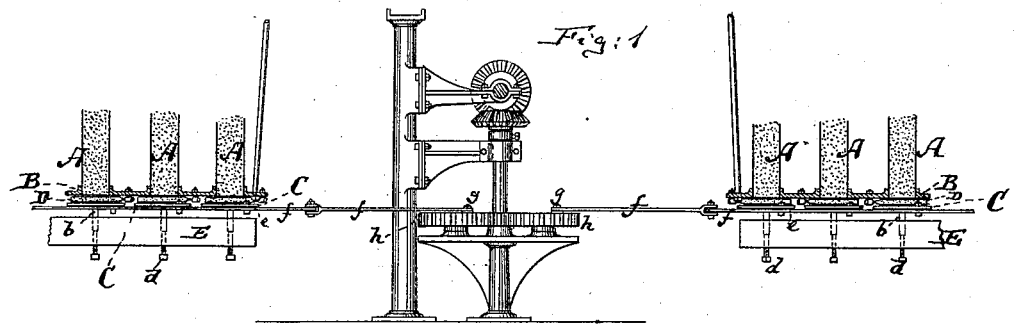
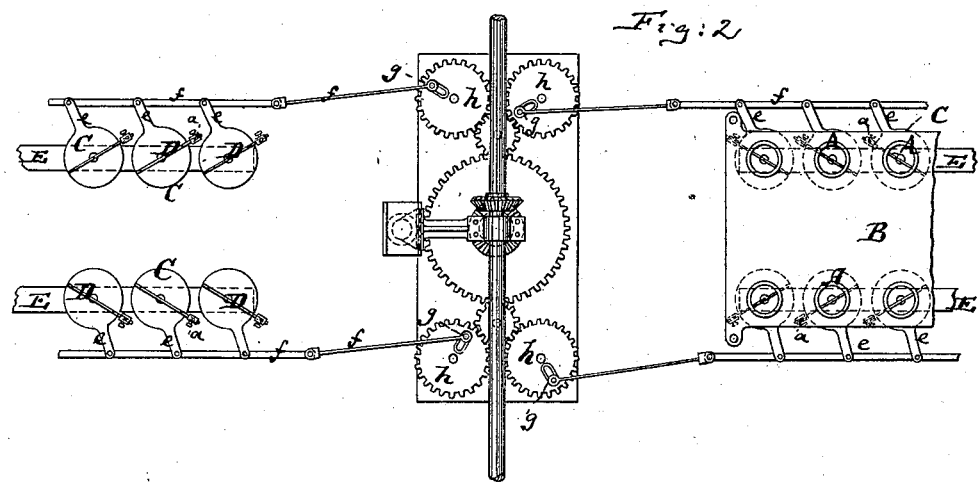
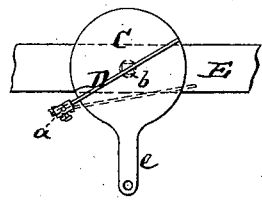
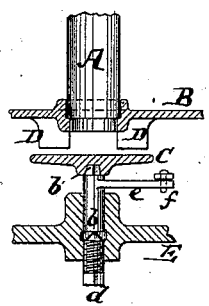
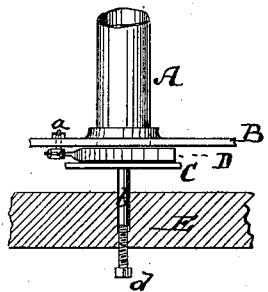
WITNESSES:
John M. Speer.
A. Schehl.
INVENTOR
Chas. H. C. Schmandt
BY
Briesen & Steele
ATTORNEYS.

UNITED STATES PATENT OFFICE.

CHARLES H. C. SCHMANDT, OF BROOKLYN, NEW YORK.

BONE-BLACK KILN.

SPECIFICATION forming part of Letters Patent No. 345,324, dated July 13, 1886.

Application filed March 4, 1886. Serial No. 193,950. (No model.)

*To all whom it may concern:*

Be it known that I, CHARLES H. C. SCHMANDT, of the city of Brooklyn, in the county of Kings and State of New York, have invented an Improved Bone-Black Kiln, of which the following is a complete specification, reference being had to the accompanying drawings.

The object of my invention is to provide efficient apparatus for the automatic and regular withdrawal of burnt char from charcoal-kilns or analogous devices, which require a regular flow of the material through pipes.

I have hereinafter illustrated the invention with more particular reference to a bone-black kiln, but desire it understood that the invention is applicable to other contrivances, and I do not limit myself, therefore, to its use on any particular machine.

The invention consists, in substance, in placing beneath every discharge-pipe an adjustable disk, which is combined with mechanism for automatically oscillating it, as hereinafter described.

It also consists in combining such disks with wipers or scrapers, and in other details of improvement, that are hereinafter more fully described.

In the drawings, Figure 1 is a sectional elevation of a charcoal-kiln having my invention. Fig. 2 is a top view of the same. Fig. 3 is an enlarged top view of a disk and scraper; Fig. 4, an enlarged side view of the disk and scraper below one of the cooler-pipes, and Fig. 5 a sectional view of a modification.

A A in the drawings are the cooler and discharge pipes, which are supported, as heretofore, on a plate or frame, B. Beneath each pipe A, the end of which is open, is placed a disk, C, at such a distance that when at rest the granular contents of the kiln will form a truncated cone between the open lower end of the cooler-pipe or retort and the upper surface of said disk, the disk being sufficiently large to leave a margin all around the cone. In this manner no char can escape from the cooler-pipe as long as the disk remains at rest. Between the open lower end of the cooler-pipe and the upper surface of the disk C, I prefer to place a scraper, D, and this scraper I prefer, moreover, to make adjustable by pivotally connecting one of its ends with the lower side of the plate B, as indicated at *a* in Fig. 4.

Fig. 3 shows the scraper, by full lines, in its central and most effective position, and by dotted lines in an outer and less effective position. Into either of these positions it can be readily placed by turning it on its supporting pivot or swivel-bolt *a*, and then tightening it sufficiently by a suitable lock-nut, with which said pivot is provided; but the nut is not to lock the scraper so that it cannot be moved by large foreign substances, as hereinafter stated. The disk C has a central socket on its lower side, as shown in Fig. 5, to receive the squared or other shaped end of an upright shaft, $b$, which rests on a screw, $d$, that has its bearings in a lower plate or frame, E; or the shaft $b$ may be rigidly attached to the disk C. By means of the screw $d$ the distance between the disk C and the lower end of the pipe A can be regulated at will. The upright shaft $b$ has a crank, $e$, which connects, by a rod or rods, $f$, with an adjustable wrist-pin, $g$, on a rotating wheel, $h$. By rotating the wheel $h$ the disks C C, with which it is connected, will be vibrated on their centers, so as, in connection with the scrapers D, to operate in discharging the contents of the pipe A in the desired ratio. Inasmuch as each disk C and each scraper D is independently adjusted, the discharge of each pipe A may be separately regulated. Where there are series of cooler-pipes, A A, as in Fig. 2, their disks C C may be united with series of pinions $h$, all of which receive their motion from the central wheel, all as shown in Fig. 2. If there were no scraper, the oscillation of each disk C would not necessarily cause any discharge of the contents of the pipe A, unless the disk were roughened on its upper face to produce a limited discharge; but with the scraper the discharge can be amplified *ad libitum*. I turn the scraper the desired distance into the cone of char that rests on the disk until the desired degree of discharge is obtained.

Instead of making the scraper adjustable, as heretofore stated, it may be rigidly attached to the under side of the plate B, as in Fig. 5. Sundry modifications of the invention will readily suggest themselves. Thus, instead of oscillating the disks, I may rotate them, or the disks may be stationary and the scrapers movable; but the construction shown in the drawings is preferred, although I do not desire to limit myself to the same.

With the movable scraper the additional advantage is enjoyed of preventing injury to the parts should a foreign substance—such as a brick or a piece of iron—find its way through the cooler-pipe. In this case the scraper will be moved aside on its pivot, and no harm done. If, for any reason, one or more of the retorts should become useless, the motion of the disk under that can at once be arrested by uncoupling it from the rod $f$, without interfering in the least with the motion of the remaining disks.

I claim—

1. The combination of the upright tube A with the vertically-adjustable disk C, placed below said tube at a distance from its open lower end, as specified.

2. The combination of the open-ended tube A with the disk C, placed below the same at a distance therefrom, and with the intervening scraper D, as specified.

3. The combination of the open-ended pipe A with the vertically-adjustable disk C, placed below the said pipe, and with the pivoted scraper D and supporting-plate B, substantially as described.

4. The combination of the open-ended pipe A and its supporting-plate B with the scraper D, and with the vertically-adjustable disk C, and with means, substantially as described, for moving said disk, as set forth.

5. The combination of the series of pipes A A with the series of movable disks C, placed beneath them, and mechanism for moving each series of disks independently of the other series of said disks, as specified.

CHARLES H. C. SCHMANDT.

Witnesses:
  C. W. VOLTZ,
  J. HENRY DICK.